United States Patent [19]
Cuevas

[11] Patent Number: 5,577,763
[45] Date of Patent: Nov. 26, 1996

[54] AIR BAG MOUNTING STRUCTURE AND METHOD

[75] Inventor: Jess A. Cuevas, Scottsdale, Ariz.

[73] Assignee: TRW Inc., Lyndhurst, Ohio

[21] Appl. No.: 412,764

[22] Filed: Mar. 29, 1995

[51] Int. Cl.⁶ .................................................. B60R 21/16
[52] U.S. Cl. ...................................... 280/728.2; 280/731
[58] Field of Search ............................. 280/728.2, 731, 280/743.1, 735

[56] References Cited

U.S. PATENT DOCUMENTS

| | | |
|---|---|---|
| 3,819,205 | 6/1974 | Dunford et al. . |
| 4,325,568 | 4/1982 | Clark et al. . |
| 4,793,631 | 12/1988 | Takada . |
| 4,877,264 | 10/1989 | Cuevas . |
| 4,902,036 | 2/1990 | Zander et al. . |
| 4,913,461 | 4/1990 | Cuevas . |
| 5,141,247 | 8/1992 | Barth . |
| 5,152,549 | 10/1992 | Aird . |
| 5,259,641 | 11/1993 | Schenk et al. . |
| 5,284,358 | 2/1994 | Rhein . |
| 5,320,379 | 6/1994 | Burnard et al. . |
| 5,354,093 | 10/1994 | Schenck et al. . |
| 5,425,548 | 6/1995 | Rasmussen ..................... 280/728.2 |
| 5,443,284 | 8/1995 | Strahl et al. ..................... 280/728.2 |

Primary Examiner—Kenneth R. Rice
Attorney, Agent, or Firm—Tarolli, Sundheim, Covell, Tummino & Szabo

[57] ABSTRACT

An apparatus comprises an inflatable air bag (22) having an inlet opening (142) and a mounting portion (144) surrounding the inlet opening. An inflator (24) provides inflation fluid for inflating the air bag (22). Electrical wires (122) extend from the inflator (24). A wire protector (124) protects the wires (122). A support plate (26) has a first portion (64) engaging the inflator (24). An attachment mechanism connects the support plate (26), inflator (24), wire protector (124) and the mounting portion 144 of the air bag (22) together. The attachment mechanism comprises a retainer (42) having a first end portion (44) for engaging and clamping the mounting portion (144) of the air bag (22) against a first surface (150) of the support plate (26). A second end portion (46) of the retainer (42) clamps the wire protector (124) against a second surface (126) of the support plate (26) opposite the first surface (150). The second end portion (46) of the retainer (42) comprises tabs (48) which extend through respective openings (182) in the support plate (26) and are bent to clamp against the wire protector (124).

19 Claims, 3 Drawing Sheets

AIR BAG MOUNTING STRUCTURE AND METHOD

BACKGROUND OF THE INVENTION

The present invention relates to an inflatable vehicle occupant restraint device. More particularly, the present invention relates to an apparatus and method for securing an air bag to a support plate which supports the air bag and an air bag inflator.

DESCRIPTION OF THE PRIOR ART

It is known to inflate an air bag to protect an occupant of a vehicle during an emergency situation, such as a collision. Often, an air bag is operably connected with a steering wheel of the vehicle. The air bag and an air bag inflator are commonly secured to a support plate. The support plate is attached, either directly or indirectly through attachment structure, to the steering wheel. The air bag inflator, when actuated, provides inflation fluid to inflate the air bag.

U.S. Pat. Nos. 5,125,549, 4,902,036, 4,793,631, 4,325,568 and 3,819,205 show typical structures for mounting an air bag and an inflator on a vehicle steering wheel. The mounting structures include threaded fasteners or rivets extending through respective mounting openings in the air bag for securement to a plate.

U.S. Pat. Nos. 5,354,093 and 5,259,641 disclose mounting structures having spring fingers extending from a retainer ring located inside an air bag. The spring fingers extend through respective mounting openings in the air bag and through holes in a base plate. The air bag is, thus, clamped between the retainer ring and base plate by the spring action of the fingers.

U.S. Pat. No. 5,320,379 discloses a mounting structure having spring fingers extending from a retainer. The fingers extend through an inflator flange and into notches formed around an inlet opening of an air bag and formed around an opening of a mounting plate. The air bag is, thus, clamped between the inflator flange and mounting plate by the spring action of the fingers.

U.S. Pat. Nos. 4,913,461 and 4,877,264 disclose mounting structures in which a portion of a support plate is deformed radially inwardly into an annular groove in a cylindrical surface of an air bag retainer ring. The support plate is, thus, restrained from moving relative to the retainer ring. The support plate also has a portion engaging an annular retainer of an air bag which is located in another annular groove in the retainer ring. The portion of the support plate engaging the air bag retainer prevents the air bag retainer from moving radially outward from the annular groove.

U.S. Pat. No. 5,141,274 discloses a mounting structure having a retainer with radially inward bent tabs engaging an inflator flange. The retainer also has radially outward bent tabs extending through an inlet opening of the air bag and engaging a support plate to clamp the air bag between the support plate and the retainer.

SUMMARY OF THE INVENTION

The present invention is directed to an air bag mounting structure and to an assembly method for securing an air bag to a support plate that is attachable to a vehicle steering wheel. The mounting structure of the present invention does not require openings in the air bag through which fasteners extend and which require alignment during an assembly operation. Because alignment of openings or notches in the air bag is not needed, the apparatus and method of the present invention are suited for automated assembly.

The apparatus of the present invention comprises an inflatable air bag having an inlet opening and a mounting portion surrounding the inlet opening. An actuatable inflator provides inflation fluid for inflating the air bag. Electrical wires extend from the inflator. A wire protector protects the wires. A support plate engages and supports the inflator. Means is provided for attaching the support plate, the inflator, the wire protector and the mounting portion of the air bag together. The attaching means comprises a retainer with a first portion for engaging and clamping the mounting portion of the air bag against the support plate. The retainer also has a second portion for clamping the wire protector against the support plate. The second portion of the retainer comprises tabs which extend through respective openings in the support plate and are bent to engage the wire protector and hold the wire protector against the support plate.

The mounting portion of the air bag comprises a resilient annular member covered by and fixed to fabric material of the air bag. The openings in the support plate are located radially outward of the mounting portion of the air bag. The mounting portion of the air bag is radially and axially positioned relative to the inflator by a cylindrical portion and a base portion, respectively, of the support plate.

The method of the present invention is a method of securing an air bag to a support plate that supports an air bag inflator. The method comprises the steps of providing an air bag with a mounting portion adjacent an inlet opening of the air bag. The mounting portion of the air bag is positioned axially and radially against a support plate. A first end portion of a retainer engages the mounting portion of the air bag on a side opposite the support plate. An inflator is supported by the support plate. A second end portion of the retainer is deformed around the support plate on a side opposite the mounting portion to clamp the mounting portion of the air bag against the support plate.

BRIEF DESCRIPTION OF THE DRAWINGS

Further advantages and features of the present invention will become apparent to those skilled in the art to which the present invention relates from reading the following specification with reference to the accompanying drawings, in which.

DESCRIPTION OF A PREFERRED EMBODIMENT

Figure 1:
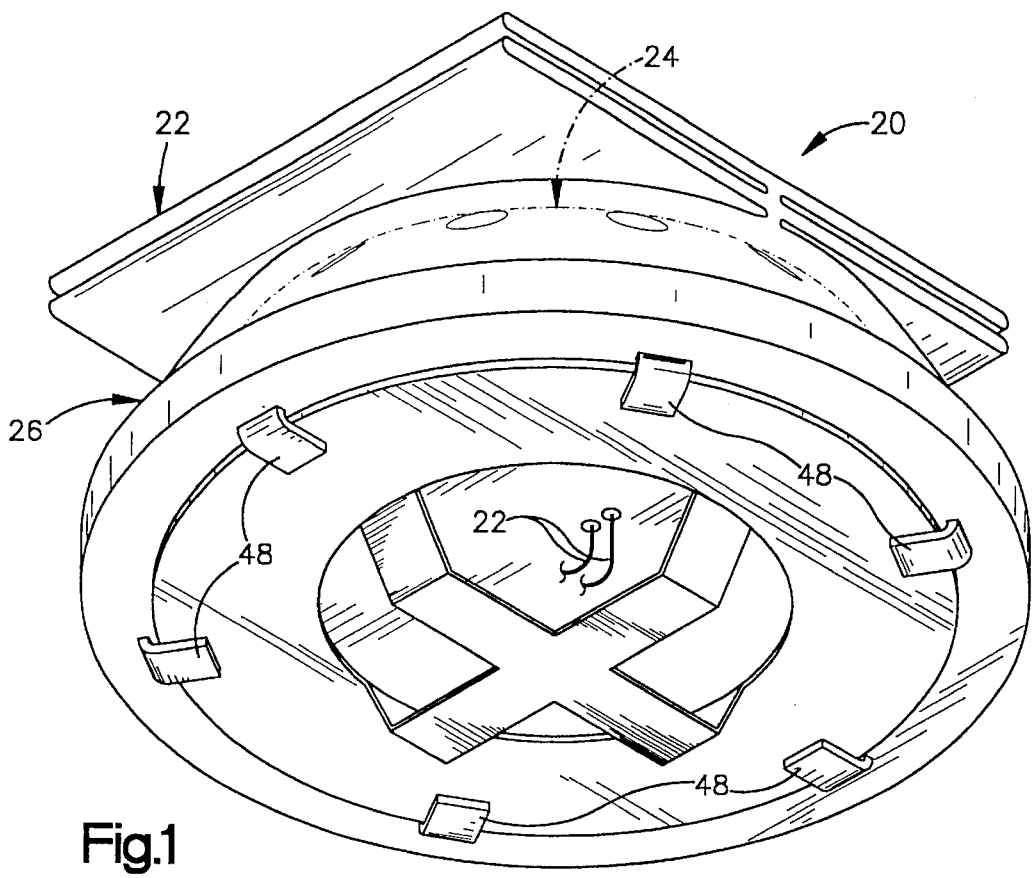
FIG. 1 is a schematic perspective bottom view of an air bag assembly embodying the present invention.
Figure 2:
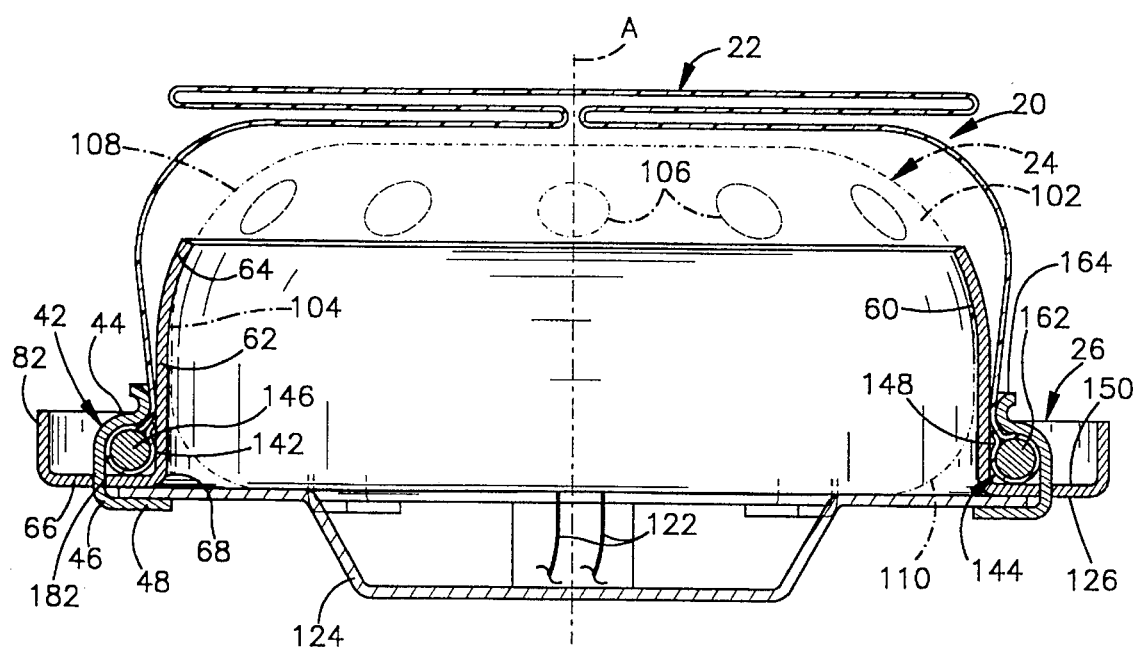
FIG. 2 is a sectional view of the air bag assembly of FIG. 1.

An air bag assembly 20 for use in a vehicle is illustrated in FIGS. 1 and 2. The air bag assembly 20 is particularly suitable as a driver's side air bag assembly to be mounted on a vehicle steering wheel (not shown).

The air bag assembly 20 includes an inflatable air bag 22, an inflator 24 and support plate 26. The inflator 24 is actuatable to provide an inflation fluid for inflating the air bag 22. The support plate 26 has a longitudinal central axis A and is operably connectable with the vehicle steering wheel in a known manner.

A retainer 42 (FIG. 2) secures the air bag 22 to the support plate 26. The retainer 42 includes a first or upper axial end portion 44, as viewed in FIG. 2, and an opposite second or lower axial end portion 46. The upper axial end portion 44 of the retainer 42 engages a portion of the air bag 22 and forces the air bag against the support plate 26. The lower axial end portion 46 of the retainer 42 includes a plurality of deformable tabs 48 (FIGS. 1 and 2) that are bent to hold the retainer in a predetermined position relative to the support plate 26.

The support plate 26 includes a recess 60 defined by a substantially cylindrical intermediate portion 62 (FIG. 2) and a first or upper axial end portion 64. The upper axial end portion 64 of the support plate 26, as viewed in FIG. 2, projects progressively radially inward of the intermediate portion 62. An annular flange or base portion 66 of the support plate 26 extends radially outward from a second or lower axial end portion 68 of the intermediate portion 62.

A cylindrical outer portion 82 of the support plate 26 is fixed to the base portion 66 concentric with, and radially outward of, the intermediate portion 62. The intermediate and outer portions 62, 82 extend substantially parallel to one another and in the same axial direction from the base portion 66. The support plate 26 is preferably made of steel or aluminum. The support plate 26 may alternatively be made of a composite material.

The inflator 24 is received in the recess 60 of the support plate 26. The inflator 24 is domed and includes a housing 102 having an intermediate and substantially cylindrical portion 104. The housing 102 has a plurality of diffuser openings 106 located in the domed axial end portion 108 of the housing 102. The inflator 24 includes an initiator or igniter (not shown). When the inflator 24 is actuated by energization of the igniter, an inflation fluid flows outward through the openings 106 in the housing 102 to inflate the air bag 22.

Electrical lead wires 122 (FIG. 2) extend from the igniter in the inflator 24. Upon the occurrence of sudden deceleration of the vehicle, as typically occurs during a collision, the lead wires 122 receive an actuation signal from vehicle electrical circuitry. The lead wires 122 transmit the actuation signal to the igniter to energize the inflator.

The intermediate portion 104 of the inflator 24 is received in and engages the intermediate portion 62 of the support plate 26. The intermediate portion 104 of the inflator 24 is sized to fit tightly within the intermediate portion 62 of the support plate 26 so transverse movement of the inflator 24 relative to the axis A is blocked. The upper axial end portion 64 of the support plate 26 is shaped to receive the domed inflator 24 to block upward movement of the inflator along the axis A, as viewed in FIG. 2, by engaging the axial end portion 108 of the inflator.

A wire protector plate 124 engages a lower end 110 of the inflator 24 and a bottom surface 126 of the base portion 66 of the support plate 26 to hold the inflator within the recess 60 of the support plate. The wire protector plate 124 is preferably made of steel. The wire protector plate 124 shields the lead wires 122 from contact with objects at the location where the lead wires are attached to the inflator 24. Thus, the wire protector plate 124 protects the lead wires 122 from damage in the event the air bag assembly 20 is, for example, accidentally struck by some object before it is connected with the vehicle steering wheel.

The air bag 22 may be made of any suitable known material, such as nylon. The air bag 22 has a circular central inlet opening 142 through which the intermediate portion 62 of the support plate 26 and the housing 102 of the inflator 24 extend. A mounting portion 144 of the air bag 22 extends about the entire periphery of the inlet opening 142.

The mounting portion 144 of the air bag 22 encircles the intermediate portion 62 of the support plate 26. The mounting portion 144 of the air bag 22 is sized to fit tightly around the intermediate portion 62 of the support plate 26. The mounting portion 144 of the air bag 22 also engages an upper surface 150 of the base portion 66 of the support plate 26.

The mounting portion 144 of the air bag 22 includes an annular member 146 enveloped by material 148 of the air bag 22 forming the inlet opening 142. The material 148 enveloping the annular member 146 is sewn together around the annular member to fix the annular member to the air bag 22 and provide a reliable and strong mounting portion 144. The mounting portion 144 of the air bag 22 is resiliently deflectable to some degree by the material 148 being resiliently deflectable and/or the annular member being resiliently deflectable. The annular member 146 is preferably made of an elastomeric material and has a toroidal shape.

Figure 3:
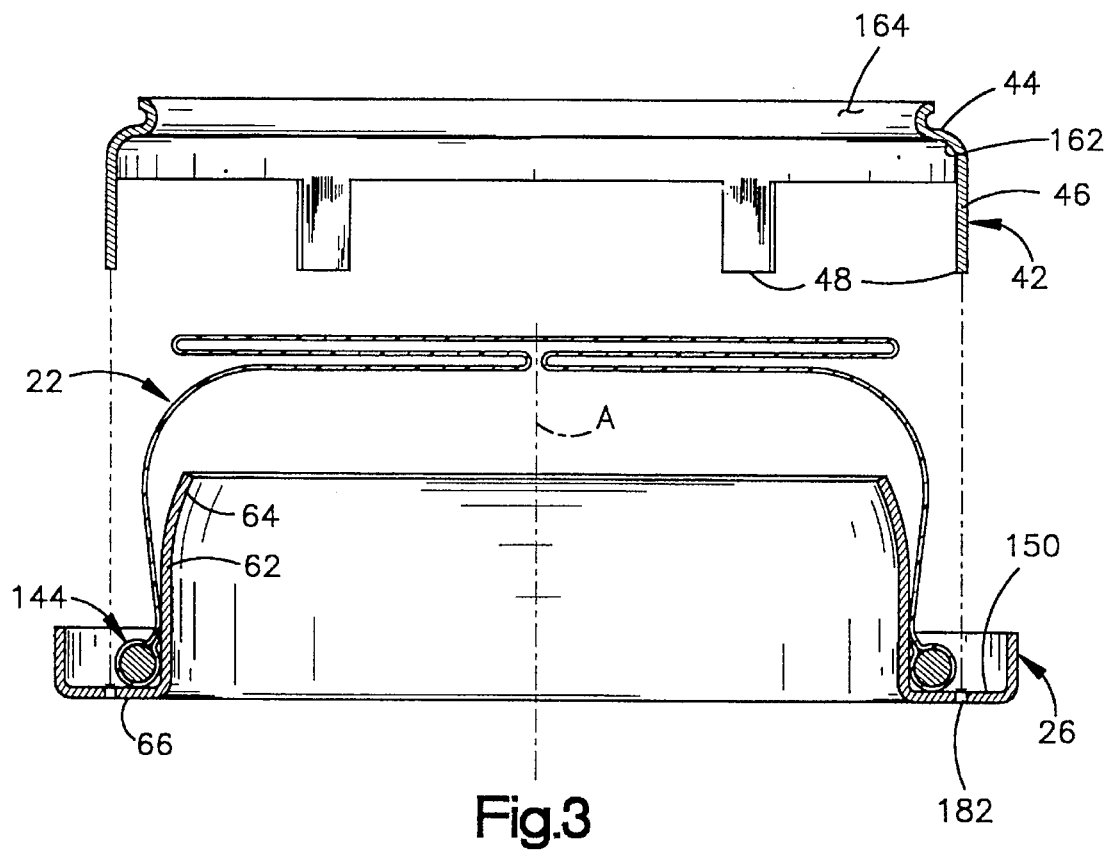
FIGS. 3–7 are sectional views illustrating sequential steps of a method for securing parts of an air bag assembly together.

The retainer 42 is preferably a one-piece metal member formed into an annular configuration (best seen in FIG. 3). The upper end portion 44 (FIG. 2) of the retainer 42 has a radiused annular surface section 162 engaging the mounting portion 144 of the air bag 22. The radiused annular surface section 162 of the retainer 42 engages at least 70°, and preferably 90°, of an axial upward and radial outward facing surface portion of the mounting portion 144, taken in a radial plane, as illustrated in FIG. 2, over the entire circumferential periphery of the mounting portion 144. This engagement assures that the retainer 42 applies an axial downward and radial inward restraining force to a radial outward and axial upward facing surface portion of the mounting portion 144. The mounting portion 144 of the air bag 22 is, thus, clamped by the retainer 42 against the base portion 66 and the intermediate portion 62 of the support plate 26 around an arcuate surface portion of the entire circumferential periphery of the mounting portion.

The upper axial end portion 44 of the retainer 42 has an outward radiused portion 164 engaging the air bag 22 at a location axially spaced from the mounting portion 144. The radiused portion 164 serves as a stress reliever when the air bag 22 fully inflates. The radiused portion 164 also assures that no sharp edge of the retainer 42 contacts the air bag 22.

A plurality of openings 182 (best seen in FIG. 3) are formed in an evenly spaced circumferential array to extend through the base portion 66 of the support plate 26. The lower axial end portion 46 of the retainer 42 has the tabs 48 extending axially downward, as viewed in FIG. 3, prior to bending during an assembly operation. The tabs 48 are arranged in an evenly spaced circumferential array corresponding to the array of openings 182 in the support plate 26. Each of the tabs 48 extends through a respective one of the openings 182 in the base portion 66 of the support plate 26.

During the assembly operation, the tabs 48 are deformed radially inward and axially upward against the wire protector plate 124 to apply a clamping force through the upper end portion 44 of the retainer 42 to the mounting portion 144 of the air bag 22. The clamping force retains the mounting portion 144 of the air bag 22 against the upper surface 150 of the base portion 66 of the support plate 26. The clamping force also retains the mounting portion 144 of the air bag 22 against an outer surface of the intermediate portion 62 of the support plate 26. The clamping force also deforms or deflects the mounting portion 144 of the air bag 22 due to the resiliency of the elastomeric annular member 146 to assure that a tensile force is always transmitted through the tabs 48.

The bent tabs 48 hold the wire protector plate 124 against the bottom surface 126 of the base portion 66 of support plate 26. The wire protector plate, in turn, forces the upper end portion 108 of the inflator 24 against the upper axial end portion 64 of the support plate 26. Thus, the retainer 42, in addition to securing the air bag 22 and inflator 24 to the support plate 26, also secures the wire protector plate 124 to the support plate to provide the air bag assembly 20 in a condition ready for connection with a vehicle steering wheel.

The method of assembling the air bag assembly 20 is illustrated in FIG. 3–7. The assembly method of the present invention is particularly suited for automated or robotic assembly.

The assembly operation starts with providing and suitably supporting the support plate 26 (FIG. 3). The mounting portion 144 of the air bag 22 is moved downwardly over the support plate 26 along the axis A, as view in FIG. 3, towards the base portion 66 of the support plate. The mounting portion 144 of the air bag 22 fits loosely around the upper end portion 64 of the support plate 26. The intermediate portion 62 of the support plate 26 has a slightly greater diameter than the upper end portion 64. As the mounting portion 144 of the air bag 22 is moved downwardly over the support plate 26 towards the base portion 66, the fit of the mounting portion becomes radially tighter along the intermediate portion 62. The mounting portion 144 of the air bag 22 is moved axially downward until it engages the upper surface 150 of the base portion 66 of the support plate 26.

Figure 4:
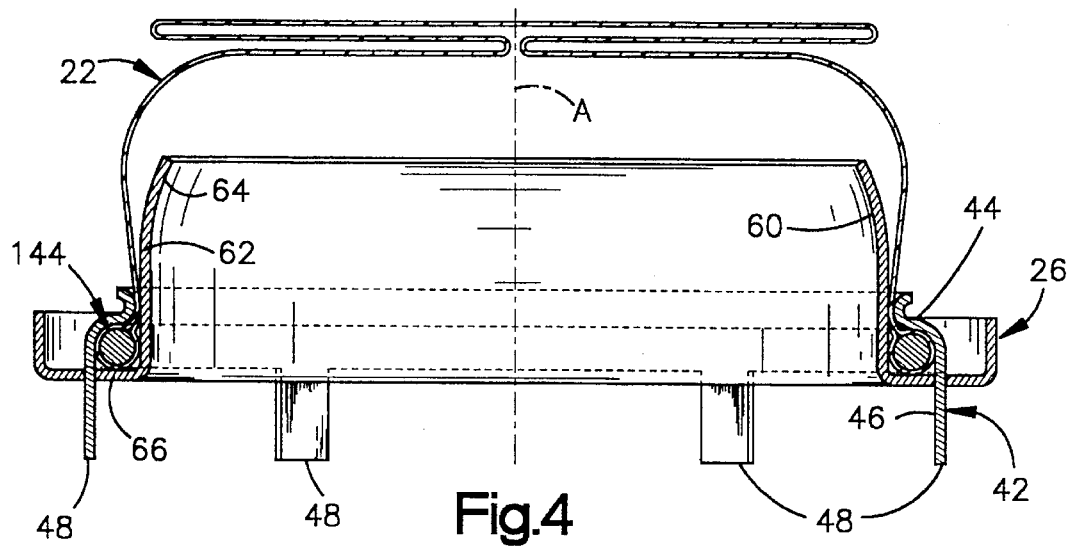

The retainer 42 (FIGS. 3 and 4) is provided and is moved downwardly along the axis A, as viewed in FIG. 4, relative to the support plate 26 and over the air bag 22. The tabs 48 of the retainer 42 are aligned with and inserted through the openings 182 in the support plate 26. The retainer 42 is moved downwardly until the upper axial end portion 44 of the retainer engages the mounting portion 144 of the air bag 22.

It is at this point that the air bag 22, the support plate 26 and the retainer 42 can be inverted for subsequent operations. The air bag 22 will be retained in its relative position along the support plate 26, as illustrated in FIG. 4, by the radiused portion 164 of the retainer 42 frictionally holding the air bag against the support plate. However, it will be understood that the parts are shown in FIGS. 5–7 in the same relative orientation as in FIGS. 3–4 for clarity.

Figure 5:
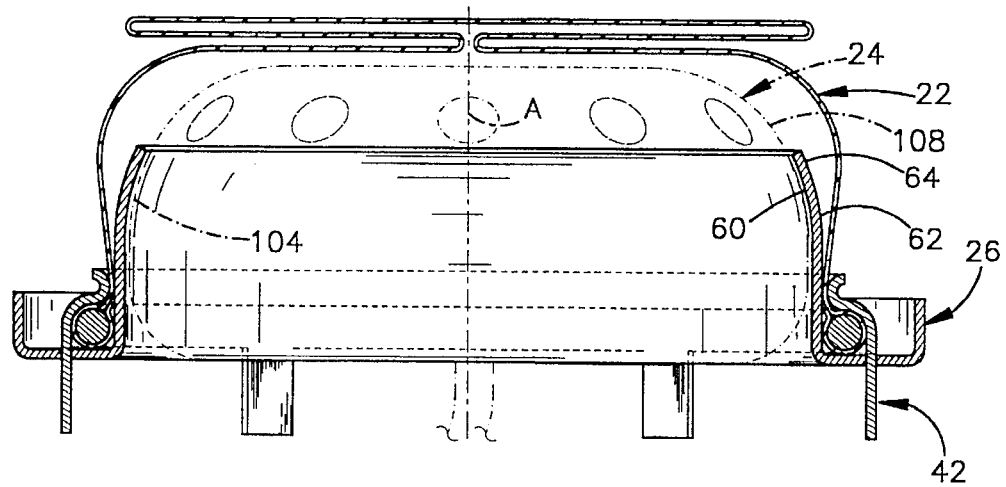

The inflator 24 is moved axially into the recess 60 of the support plate along the axis A, as illustrated in FIG. 5. The domed end portion 108 of the inflator 24 engages the end portion 64 of the support plate 26 and is prevented from further axial movement in one direction (upward in FIG. 5) by the engagement with the end portion 64.

Figure 6:
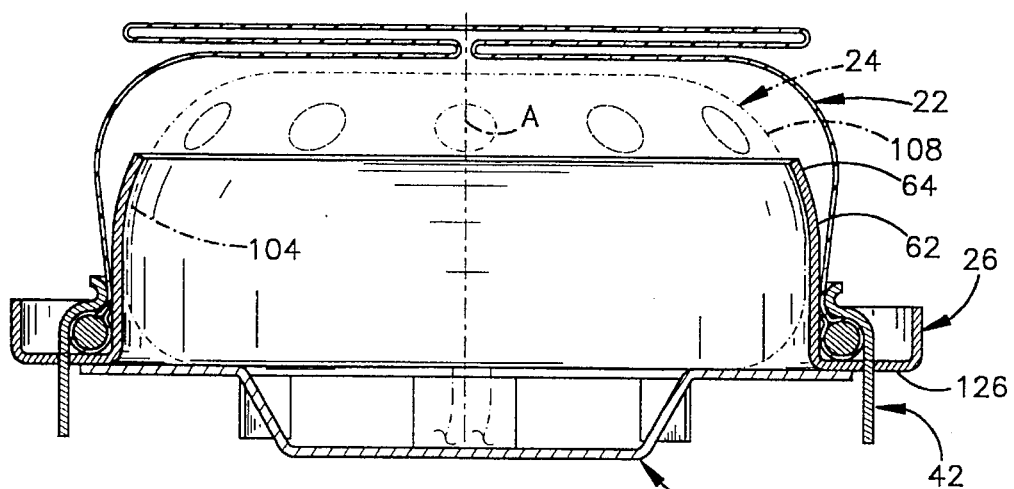

The wire protector plate 124 is then moved axially to engage the surface 126 of the base portion 66 of the support plate 26, as illustrated in FIG. 6. The wire protector plate 124 also engages the end 110 of the inflator 24 to hold the end 108 of the inflator against the end 64 of the support plate 26. At this time, if required, the lead wires 122 can be routed through an open section in the wire protector plate 124.

Figure 7:
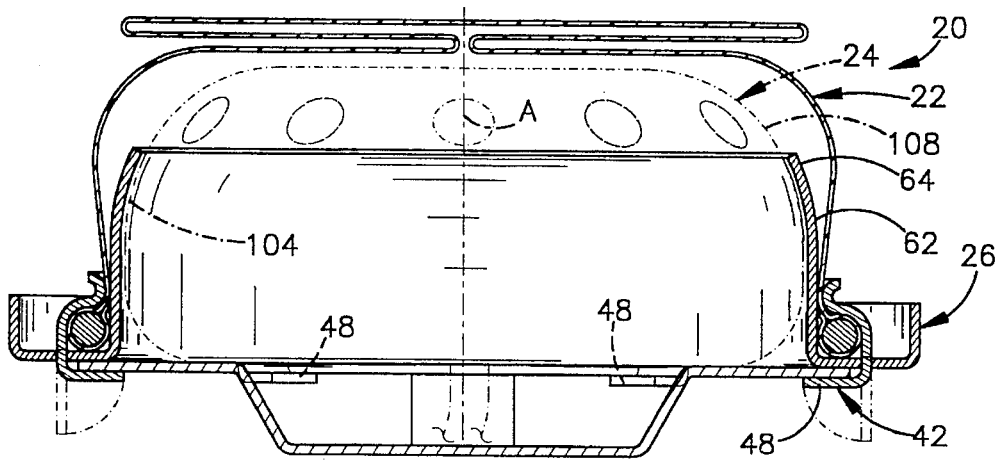

The tabs 48 are then bent or deformed radially inward, as illustrated in FIG. 7, to engage the wire protector plate 124. The bent tabs 48 retain the wire protector plate 124 against the base portion 66 of the support plate 26. When the ends of the tabs 48 are bent against the wire protector plate 124, a force is transmitted through the tabs to the upper end portion 44 of the retainer 42 to hold the mounting portion 144 of the air bag 22 against the surface 126 of the base portion 66 of the support plate 26. Due to the resilient deflectability of the mounting portion 144 of the air bag 22, the axial and radial clamping force of the retainer 42 is always maintained to assure the wire protector plate 124, the inflator 24 and the air bag 22 are retained in predetermined positions relative to the support plate 26.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

an inflatable air bag having an inlet opening and a mounting portion surrounding the inlet opening;

an inflator for providing inflation fluid for inflating said air bag;

electrical wires extending from said inflator;

a wire protector for protecting said wires;

a support plate having a portion engaging said inflator; and means for attaching said support plate, inflator, wire protector and air bag together, said attaching means comprising a retainer having a first portion for engaging said mounting portion of said air bag and clamping said mounting portion of said air bag against a first surface of said support plate and a second portion for clamping said wire protector against a second surface of said support plate opposite said first surface, said second portion of said retainer comprising tabs which extend through respective openings in said support plate without extending through a material surface of said air bag and clamp against said wire protector.

2. The apparatus set forth in claim 1 wherein the openings in said support plate are located radially outward of said mounting portion of said air bag.

3. The apparatus set forth in claim 1 wherein said mounting portion of said air bag is radially and axially positioned relative to said inflator by said support plate.

4. The apparatus set forth in claim 1 wherein said mounting portion of said air bag comprises an elastomeric annular member covered by material of said air bag and fixed to said air bag.

5. The apparatus set forth in claim 4 wherein said annular member has a toroidal shape.

6. The apparatus set forth in claim 1 wherein said mounting portion of said air bag comprises an elastomeric portion which is resiliently deflectable to maintain the clamping of said retainer against said mounting portion and said wire protector.

7. The apparatus set forth in claim 6 wherein said retainer further includes an annular surface section engaging a portion of a circumferential periphery of said mounting portion of said air bag around at least 70° of the circumferential cross-section of said mounting portion taken in a radial plane.

8. The apparatus set forth in claim 1 further including a radiused surface provided on said first portion of said retainer engaging a portion of said air bag adjacent said mounting portion.

9. An apparatus for securing an air bag, the air bag having an inlet opening and a mounting portion located adjacent the inlet opening, the mounting portion of the air bag having first and second surface portions, said apparatus comprising:

a support plate having an axis and a surface facing in an axial direction for engaging the first surface portion of the mounting portion of the air bag and for positioning the mounting portion; and a retainer located outside of the air bag, and having a first axial end portion and a second axial end portion, said first axial end portion engaging the second surface portion of the mounting portion of the air bag, said second axial end portion being deformable against said support plate without extending through a material surface of the air bag and to hold said retainer in a predetermined position relative to said support plate and hold the mounting portion of the air bag in engagement with said retainer and said support plate.

10. The apparatus set forth in claim 9 wherein said first axial end portion of said retainer also engages a peripheral surface portion of the mounting portion of the air bag facing axially away from said axial surface of said support plate.

11. The apparatus set forth in claim 10 wherein said mounting portion of said air bag comprises an elastomeric annular member covered by material of said air bag and fixed to said air bag, and said first axial end portion of said retainer deforming said mounting portion of said air bag.

12. The apparatus set forth in claim 10 wherein said support plate further includes a cylindrical surface with a longitudinal central axis, said cylindrical surface extending from said axial surface of said support plate to radially position said mounting portion of said air bag relative to the axis.

13. An apparatus for securing an air bag, the air bag having an inlet opening and a mounting portion located adjacent the inlet opening, the mounting portion of the air bag has first and second surface portions, said apparatus comprising:

a support plate having an axis and a surface facing in an axial direction for engaging the first surface portion of the mounting portion of the air bag and for positioning the mounting portion; and a retainer having a first axial end portion and a second axial end portion, said first axial end portion engaging the second surface portion of the mounting portion of the air bag, said second axial end portion being deformable against said support plate without extending through a material surface of the air bag and to hold said retainer in a predetermined position relative to said support plate and hold the mounting portion of the air bag in engagement with said retainer and said support plate;

a plurality of tabs defining said second axial end portion of said retainer, a plurality of openings being in said support plate, and each of said openings receiving a respective tab of said retainer.

14. The apparatus set forth in claim 13 wherein said openings are located in a circumferential array radially outward of said mounting portion of said air bag.

15. An apparatus for securing an air bag, the air bag having an inlet opening and a mounting portion located adjacent the inlet opening, the mounting portion of the air bag has first and second surface portions, said apparatus comprising:

a support plate having an axis and a surface facing in an axial direction for engaging the first surface portion of the mounting portion of the air bag and for positioning the mounting portion; and a retainer having a first axial end portion and a second axial end portion, said first axial end portion engaging the second surface portion of the mounting portion of the air bag, said second axial end portion being deformable against said support plate without extending through a material surface of the air bag and to hold said retainer in a predetermined position relative to said support plate and hold the mounting portion of the air bag in engagement with said retainer and said support plate;

said first axial end portion of said retainer also engaging a peripheral surface portion of said mounting portion of said air bag facing axially away from said axial surface of said support plate, said mounting portion of said air bag comprising a toroidal, elastomeric annular member covered by material of said air bag and fixed to said air bag, said first axial end portion of said retainer deforming said mounting portion of said air bag, said first axial end portion of said retainer including an annular curved surface section engaging a portion of the periphery of said mounting portion over at least 70° of the cross-section of said mounting portion taken in a plane extending radially of a central axis of said support plate.

16. The apparatus set forth in claim 15 further including a radiused surface portion on said first portion of said retainer engaging a portion of said air bag adjacent said mounting portion.

17. A method for securing an air bag to a plate supporting an inflator, said method comprising the steps of:

providing a support plate having an axis and an axially extending portion defining a recess;

providing an air bag with a mounting portion adjacent an inlet opening;

providing an inflator;

positioning a first portion of the mounting portion of the air bag against the support plate and a second portion of the air bag around the axially extending portion of the support plate;

locating the inflator within the recess in the support plate;

providing a wire protector engaging the inflator and engaging the support plate on a side opposite the mounting portion of the air bag;

capturing the mounting portion of the air bag with a retainer by engaging a third portion of the mounting portion of the air bag located on side of the mounting portion opposite the first portion with a first axial end portion of the retainer; and deforming a second axial end portion of the retainer against the wire protector to clamp the mounting portion of the air bag against the support plate and hold the inflator in the recess.

18. The method defined in claim 17 wherein said step of providing an air bag further includes the step of fixing an annular member in the mounting portion of the air bag.

19. A method for securing an air bag to a plate which is connectable with a vehicle component, said method comprising the steps of:

providing an air bag with a resiliently deflectable mounting portion adjacent an inlet opening;

positioning the mounting portion of the air bag against a surface of a support plate having an axis, the surface facing in an axial direction;

engaging an outwardly facing peripheral surface of the mounting portion of the air bag with a first axial end portion of a retainer so a second axial end portion of the retainer projects past a side of the support plate opposite the surface engaging the mounting portion of the air bag without extending through material of the air bag, and so the retainer is located outside of the air bag; and deforming the second axial end portion of the retainer to clamp the mounting portion of the air bag against the support plate with the first axial end portion of the retainer.

* * * * *